United States Patent
Pierro

(10) Patent No.: US 11,739,682 B2
(45) Date of Patent: Aug. 29, 2023

(54) SPLIT-CYCLE INTERNAL COMBUSTION ENGINE

(71) Applicant: FPT INDUSTRIAL S.P.A., Turin (IT)

(72) Inventor: Enzo Pierro, Venaria Reale (IT)

(73) Assignee: FPT INDUSTRIAL S.P.A., Turin (IT)

( * ) Notice: Subject to any disclaimer, the term of this patent is extended or adjusted under 35 U.S.C. 154(b) by 0 days.

(21) Appl. No.: 17/783,501

(22) PCT Filed: Dec. 9, 2020

(86) PCT No.: PCT/IB2020/061705
§ 371 (c)(1),
(2) Date: Jun. 8, 2022

(87) PCT Pub. No.: WO2021/116941
PCT Pub. Date: Jun. 17, 2021

(65) Prior Publication Data
US 2023/0003165 A1  Jan. 5, 2023

(30) Foreign Application Priority Data

Dec. 9, 2019 (IT) .......................... 102019000023358

(51) Int. Cl.
*F02B 33/22* (2006.01)

(52) U.S. Cl.
CPC .................................. *F02B 33/22* (2013.01)

(58) Field of Classification Search
CPC .......... F02B 33/06; F02B 33/20; F02B 33/22; F02B 25/22; F02B 61/06; F02B 41/02; F02B 41/08; F02B 2720/158
See application file for complete search history.

(56) References Cited

U.S. PATENT DOCUMENTS

| | | | |
|---|---|---|---|
| 1,881,582 A | | 10/1932 | Holloway |
| 2,205,608 A | * | 6/1940 | Toth ........................ F02B 41/08 60/613 |
| 3,675,630 A | | 7/1972 | Stratton |

(Continued)

FOREIGN PATENT DOCUMENTS

| | | | | |
|---|---|---|---|---|
| CN | 102191996 A | * | 9/2011 | .............. F02B 33/22 |
| DE | 3803152 A1 | * | 8/1989 | |

(Continued)

OTHER PUBLICATIONS

International Search Report and Written Opinion in PCT Application No. PCT/IB2020/061705, dated Mar. 24, 2021.

*Primary Examiner* — Hung Q Nguyen
(74) *Attorney, Agent, or Firm* — Leason Ellis LLP

(57) ABSTRACT

A split-cycle internal combustion engine is provided with an engine block and an expansion section having a plurality of expansion cylinders and a rotating drive shaft, which is supported by a first portion of the engine block and is operated by the expansion cylinders; the engine is further provided with a compression section having a volumetric compressor with a rotating driven shaft, which is supported by a second portion of the engine block and is distinct and spaced apart from the rotating drive shaft; the volumetric compressor has at least one compression cylinder extending along an axis, which is inclined relative to the axes of the expansion cylinders so as to form an angle.

7 Claims, 4 Drawing Sheets

(56) References Cited

U.S. PATENT DOCUMENTS

| | | | |
|---|---|---|---|
| 4,170,970 A * | 10/1979 | McCandless | F02B 41/06 123/78 F |
| 5,265,564 A | 11/1993 | Dullaway | |
| 8,267,056 B2 | 9/2012 | Dean | |
| 2003/0116106 A1* | 6/2003 | Clarke | F02B 1/12 123/65 VD |
| 2003/0183211 A1 | 10/2003 | Bigi | |
| 2010/0077987 A1* | 4/2010 | Voisin | F02M 25/0222 60/299 |
| 2012/0085301 A1* | 4/2012 | Islas | F02B 41/06 123/52.1 |
| 2017/0058759 A1 | 3/2017 | Tour | |

FOREIGN PATENT DOCUMENTS

| | | | | |
|---|---|---|---|---|
| JP | 6295487 B1 * | 3/2018 | | |
| RU | 2520276 C1 * | 6/2014 | | F02B 33/22 |
| WO | WO-2012143940 A1 * | 10/2012 | | F01L 1/344 |
| WO | WO-2015009959 A1 * | 1/2015 | | F01L 1/46 |
| WO | WO-2015057112 A1 * | 4/2015 | | F02B 25/145 |

* cited by examiner

US 11,739,682 B2

SPLIT-CYCLE INTERNAL COMBUSTION ENGINE

CROSS-REFERENCE TO RELATED APPLICATIONS

This Patent Application is a U.S. National Phase Application under 35 U.S.C. § 371 of International Patent Application No. PCT/IB2020/061705, filed on Dec. 9, 2020, which claims priority from Italian Patent Application No. 102019000023358 filed on Dec. 9, 2019, all of which are incorporated by reference, as if expressly set forth in their respective entireties herein.

TECHNICAL FIELD

The invention relates to a split-cycle internal combustion engine.

KNOWN STATE OF THE ART

As it is known, split-cycle engines comprise at least one compression cylinder, which is dedicated to the compression of the oxidizing air, and at least one combustion cylinder or expansion cylinder, which communicates with the compression cylinder through one or more inlet valves so as to receive a charge of compressed air with every cycle, together with a fuel injection. The expansion cylinder is dedicated to the combustion of the air/fuel mixture, to the expansion of the burnt gases to generate mechanical energy and to the discharge of said gases, so that it basically acts like a two-stroke engine, which, in turn, drives the compression cylinder.

Expansion cylinders and compression cylinders are generally arranged in line, namely they are arranged in positions that are aligned with one another along a same rotating shaft.

Many studies have been carried out on this type of engine and some prototypes were built over the years, which are mainly aimed at being used in the field of energy generation, but there is also a need for applications in the automotive industry. In this industry, a solution is needed, which is compatible with the layout and the spaces available in the engine compartments of already circulating vehicles. In particular, a relatively compact solution is needed, which has dimensions that can be compared with the spaces already available in the vehicle for the installation of an already existing four-stroke engine, so as to be able to replace this engine with a split-cycle engine in order to improve performances and/or reduce consumptions and polluting emissions, but also limiting, at the same time, the changes to be made to other components of the engine compartment and, more in general, limiting the costs arising from this vehicle installation.

Furthermore, a split-cycle engine is needed, which can be manufactured by using, as much as possible, the technologies and the knowledge that are already normally used for manufacturing normal four-stroke engines for vehicles and by modifying the different devices, accessories, ducts, components, etc. of the engine itself as little as possible.

Therefore, the object of the invention is to provide a split-cycle internal combustion engine, which fulfils the needs discussed above in a simple and economic manner.

SUMMARY OF THE INVENTION

According to the invention, there is provided a split-cycle internal combustion engine as defined in claim 1.

BRIEF DESCRIPTION OF THE DRAWINGS

The invention will be best understood upon perusal of the following detailed description of a preferred embodiment, which is provided by way of non-limiting example, with reference to the accompanying drawings, wherein.

PREFERRED EMBODIMENT OF THE INVENTION

Figure 1:
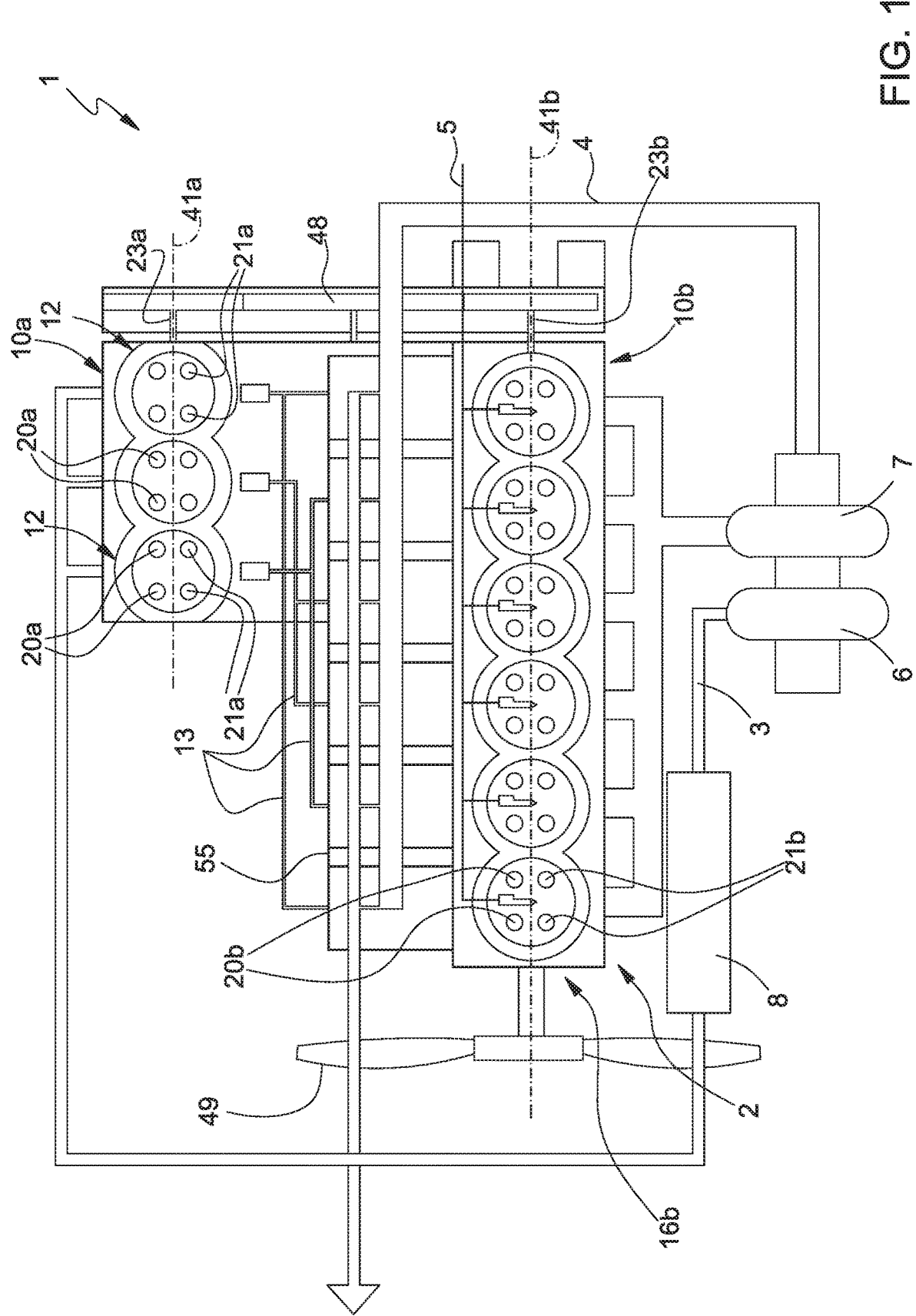
FIG. 1 is a diagram showing an engine system provided with a split-cycle internal combustion engine according to the preferred embodiment of the invention.

With reference to what is schematically shown in FIG. 1, reference number 1 indicates an engine system designed to be installed in an engine compartment of a vehicle (not shown), in particular a motor vehicle or an agricultural machinery, for driving the vehicle.

The system 1 comprises a split-cycle internal combustion engine 2; a line 3 to feed air to the engine 2; a line 4 to convey exhaust gases from the engine 2 towards an exhaust system or an after-treatment system (not shown); and an injection system 5 to fed fuel into the engine 2. Furthermore, the system 1 preferably comprises: a supercharging compressor 6, which is installed along the line 3 so as to compress the air fed to the engine 2 and is driven, for example, by a turbine 7 operated, in turn, by the burnt gases originated by the engine 2, said turbine being arranged along the line 4; and a heat exchanger 8, for example defined by a so-called intercooler, arranged along the line 3 between the compressor 6 and the engine 2 so as to cool the air that was compressed by the compressor 6.

The engine 2 consists of a compression section 10a and of an expansion section 10b: the compression section 10a is dedicated to the compression of air coming from the line 3 and comprises a volumetric compressor 12, which is defined by a reciprocating piston compressor. The compressor 12 must preferably be able to operate at pressures exceeding 70 bar.

Figure 4:
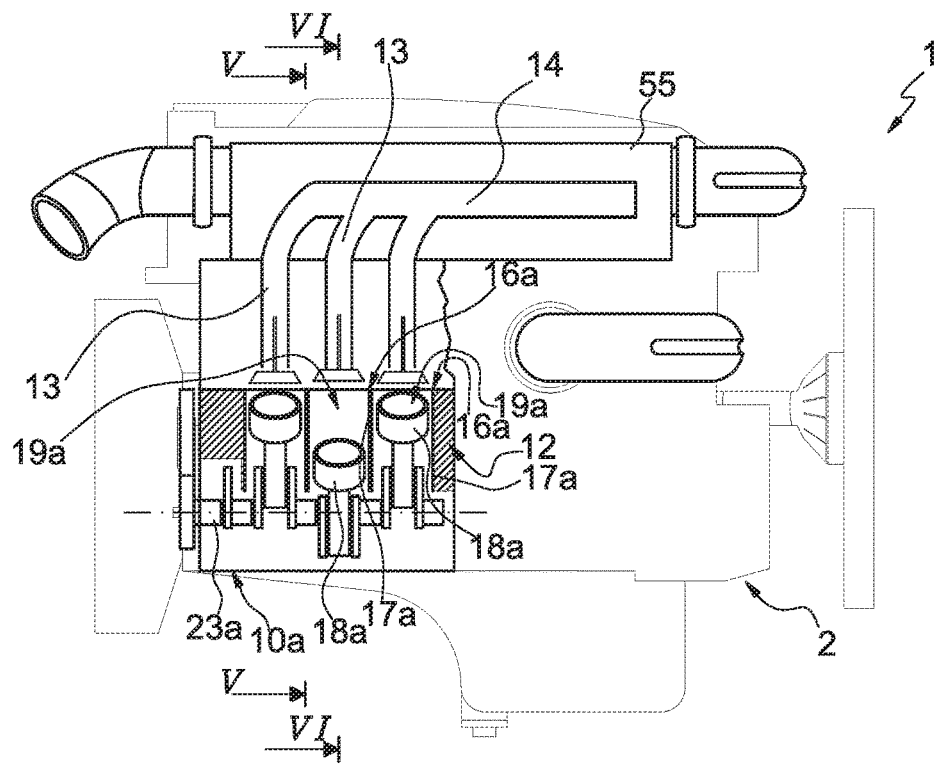
FIGS. 3 and 4 are a rear view and a side view, respectively, showing, in a simplified manner and with schematic parts, the split-cycle engine of FIG. 2.

The expansion section 10b, on the other hand, receives compressed air from the compression section 19a through one or more connection ducts 13 and an intake manifold 14 (FIG. 4). The section 10b also receives the fuel fed by the system 5 and is dedicated to the combustion of the air/fuel mixture, to the expansion of the gases produced by the combustion and to the discharge of said gases, so that the expansion section 10b basically acts like a two-stroke engine. Since the section 10b is dedicated to these phases, the combustion takes place without significant temperature changes, thus reducing emission levels compared to four-stroke engines.

With reference to FIG. 4, the compressor 12 comprises one or more compression cylinders 16a. For example, there are three cylinders 16a. Each cylinder 16a comprises a respective liner 17a and a respective piston 18a defining, between them, a compression chamber 19a designed to receive an air flow through one or more inlet valves 20a (FIG. 1) of the line 3. The pistons 18a are provided with a reciprocating motion so as to carry out, with every cycle, an intake stroke, during which air flows into the compression chamber 19a, and a compression stroke, during which air is compressed and then flows out of the compression chamber 19a, through one or more delivery valves 21a (FIG. 1), into a corresponding duct 13. The compressor 12 further comprises a rotating shaft 23a, which is defined, in particular, by a crankshaft and provides the pistons 18a with the aforesaid reciprocating motion.

Figure 3:
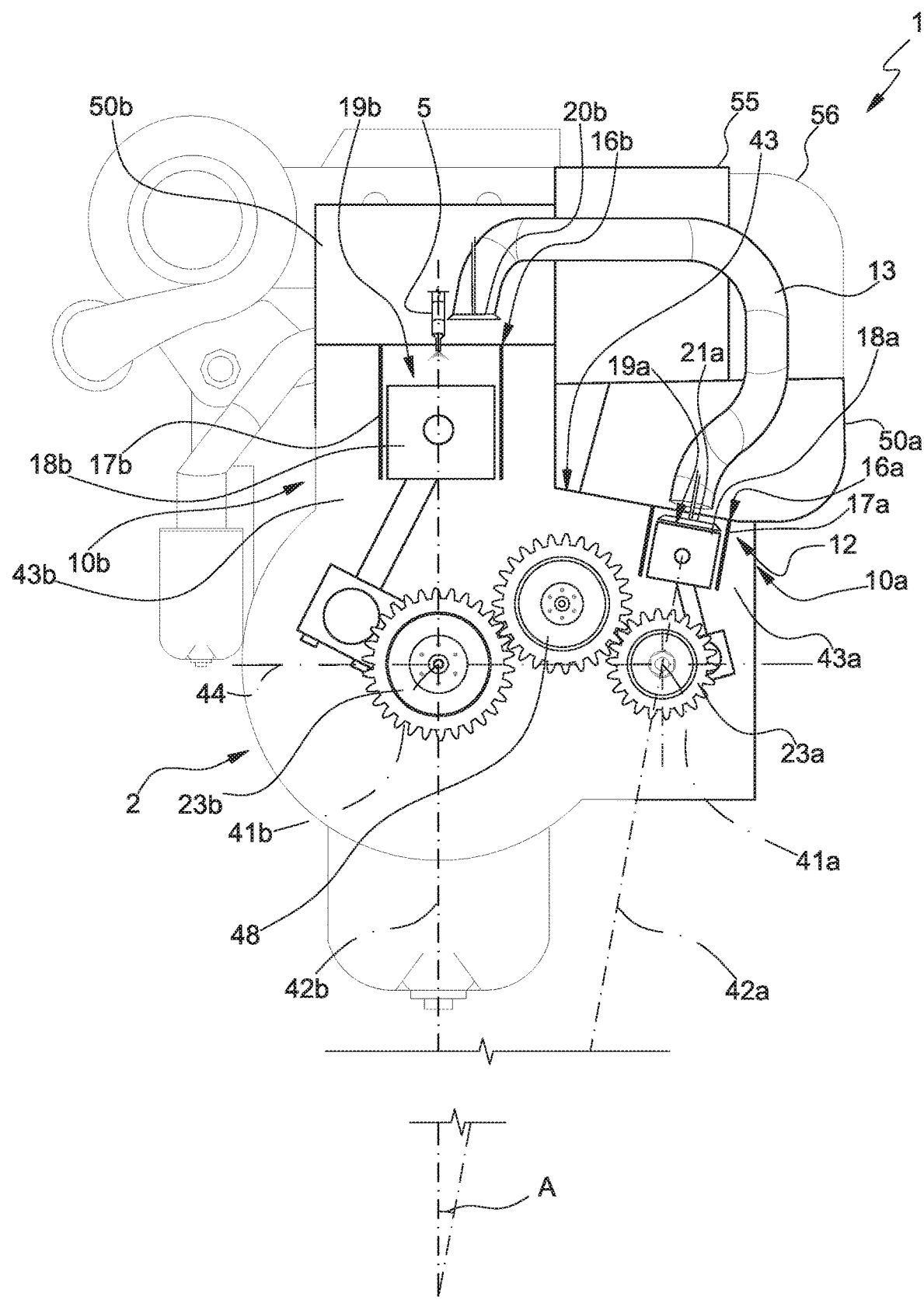

With reference to FIG. 3, the expansion section 10b comprises a plurality of expansion cylinders (or combustion cylinders) 16b. For example, the displacement of the cylinders 16b is two to three times the one of the cylinders 16a. Each cylinder 16b comprises a respective liner 17b and a respective piston 18b defining, between them, a combustion chamber 19b designed to receive the air from the manifold 14 and/or from the ducts 13, through one or more intake valves 20b, together with the fuel injected by the system 5. The pistons 18b makes a reciprocating motion having an expansion stroke, during which air and fuel flow into the combustion chamber 19b and form a mixture, which is ignited (in a controlled manner or spontaneously) in order to then produce an expansion of the burnt gases and generate mechanical energy; and an exhaust stroke, during which the burnt gases are discharged through one or more exhaust valves 21b (FIG. 1) into the line 4.

The pistons 18b operate a rotating drive shaft 23b, which is defined by crankshaft and causes the rotation of the shaft 23a. According to an alternative embodiment which is not shown herein, the shaft 23a of the compressor 12 is driven by an electric motor, which is powered by current produced by a generator, which, in turn, is directly or indirectly driven by the drive shaft 23b.

According to an aspect of the invention, the shafts 23a and 23b rotate about respective axes 41a and 41b, which are distinct and spaced apart from one another and, in particular, are parallel. The pistons 18a and 8b slide along respective axes 42a and 42b, which preferably are inclined relative to one another so as to form, between them, an angle A, for example ranging from 0° to 30°. At the same time, the engine 2 comprises an engine block 43, where the compressor 12 is integrated. In other words, according to FIGS. 5 and 6, the engine block 43 comprises two portions 43a and 43b: the portion 43a houses the compression cylinders 16a and supports the shaft 23a, whereas the portion 43b houses the expansion cylinders 16b and supports the shaft 23b. More in detail, FIG. 6 reveals that the portions 43a and 43b house the liners 17a and 17b, respectively, and are hollow so as to allow for the passage of the shanks of the connecting rods connecting the shafts 23a and 23b to the respective pistons 18a, 18b.

The cylinders 16a are not in line with the cylinders 16a; indeed, the portion 43a is arranged beside the portion 43b along a direction 44 that is orthogonal to the axes 41b and 42b. In the specific example shown herein, the engine block 43 defines one single monolithic piece (manufactured by casting). According to a variant which is not shown herein, the portions 43a and 43b can define respective distinct pieces, manufactured by casting, which are fixed to one another.

Figure 5:
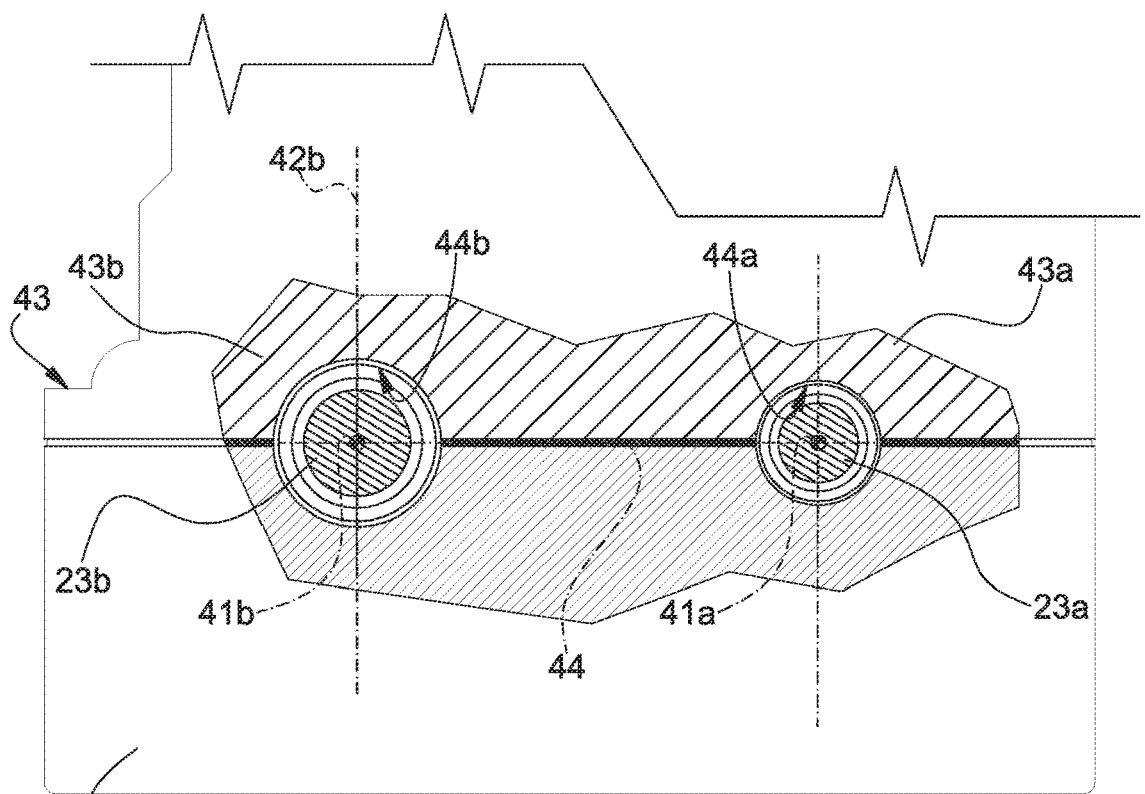
FIGS. 5 and 6 are cross sections according to the section lines V-V and VI-VI, respectively, of FIG. 4.
Figure 6:
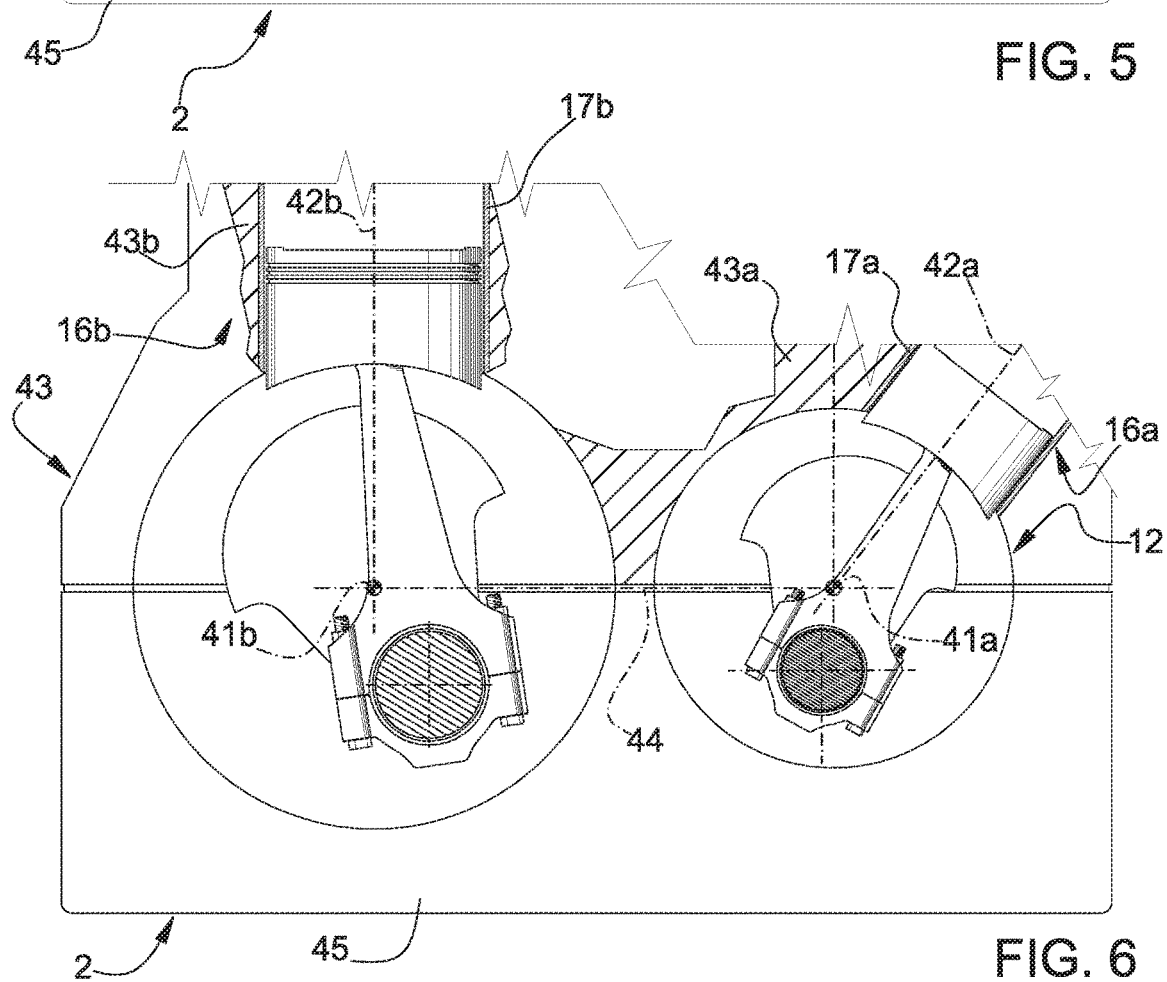

According to FIG. 5, the shafts 23a and 23b are coupled to the engine block 43 in a rotary manner by means of respective main bearings, which engage respective seats 44a and 44b. The portions 43a and 43b define the upper parts of the seats 44a and 44b. In the particular example shown herein, the engine 2 further comprises a lower engine block 45, which defines the lower parts of the seats 44a and 44b, is fixed to the engine block 43 in a known manner, which is not shown herein, and is preferably defined by a monolithic piece (manufactured by casting).

With reference to FIG. 3, the engine 2 further comprises a mechanical transmission 48, for example a gear transmission, to transmit the motion from the shaft 23b to the shaft 23a. The transmission 48, in particular, is arranged on the outside of the engine block 43 in a suitable housing, in the area of a rear end of the engine 2 (wherein "front end" means the end where there is usually installed a fan 49 to convey external cooling air, whereas "rear end" means the one where there is usually mounted a flywheel, not shown herein). According to a variant which is not shown herein, the transmission 48 is mounted in an opposite position, namely at the front ends of the shafts 23a and 23b.

The engine 2 further comprises two cylinder heads 50a and 50b, which are schematically shown in FIG. 3, are distinct from one another, are part of the sections 10a and 10b, respectively, and are fixed to the engine block 43 in a known manner, which is not shown herein. In other words, the cylinder head 50a is fixed to the portion 43a and carries the valves 20a and 21a, whereas the cylinder head 50b is fixed to the portion 43b and carries the valves 20b and 21b. The portions 43a and 43b of the engine block 43 and the cylinder heads 50a, 50b have suitable inner channels, which are not shown herein, to cool and lubricate the engine 2. In particular, the portions 43a and 43b are lubricated by a same lubrication system, whereas they can share a same cooling system or be cooled by independent systems.

Figure 2:
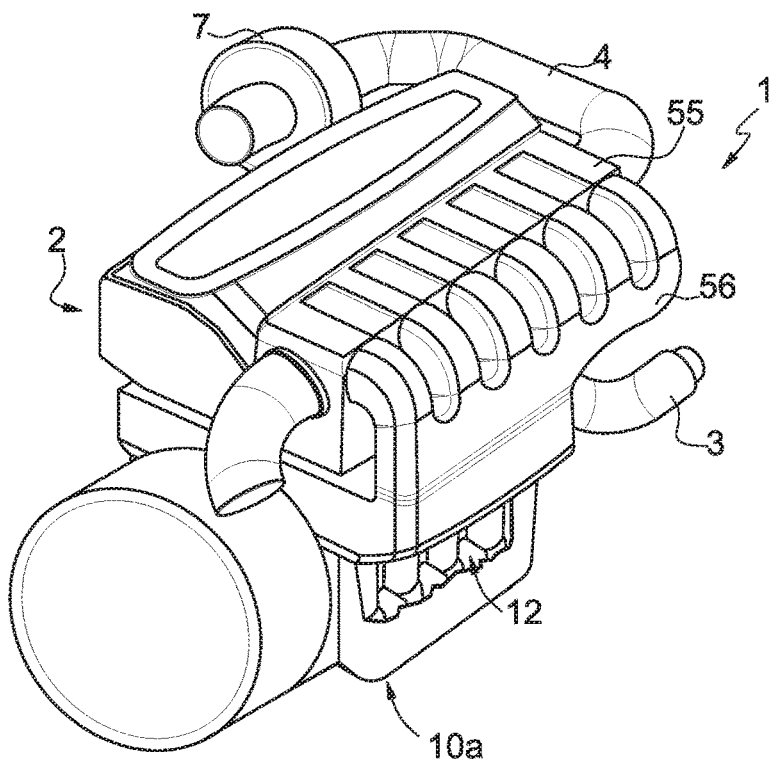
FIG. 2 shows, in perspective and with parts removed for greater clarity, the split-cycle engine shown in the diagram of FIG. 1.

According to a preferred aspect of the invention, which is shown in a schematic manner in FIGS. 1 and 4, the system 1 comprises a heat exchanger 55, which is fixed to the engine 2 in a position such as to transfer heat from the line 4 to the ducts 13 and/or to the manifold 14 where the air compressed by the section 10a flows. In particular, the heat exchanger 55 is arranged downstream of the turbine 7 and receives air from the compressor 12 through a proper distributor 56 (FIG. 2). The heat exchanger 55 is also called "recuperator", as it recuperates energy from the exhaust gases in order to allow the air mass introduced into the expansion cylinders 16b to reach a higher temperature.

In particular, according to FIG. 3, the heat exchanger 55 is arranged above the cylinder head 50a and, more in particular, in a position beside the cylinder head 50b parallel to the direction 44. The heat exchanger 55 is preferably fixed to the sole cylinder head 50b.

Owing to the above, the advantages of the engine 2 and of the system 1 are evident to a person skilled in the art. In particular, the fact of separating and spacing the shaft 23a of the compressor 12 from the drive shaft 23b allows for a greater freedom in the design of the components of the compression section 10a and for the possibility of cooling the compressor 12 in a dedicated manner, independently of the expansion cylinders 16b. More in detail, the fact of placing the compression section 10a beside the expansion section 10b along the direction 44 and the fact of using an inclined, "V"-shaped configuration between axes 42a and 42b leads to an extremely compact solution, with dimensions that are compatible with the spaces available in the engine compartments of the automotive industry, and—at the same time—allows manufacturers to use technologies and/or production lines that are similar to the ones already used to manufacture current internal combustion engines.

For example, some preliminary studies were carried out concerning a split-cycle engine having six expansion cylinders, obtained starting from an already existing four-stroke Diesel engine with six cylinders (with a displacement of approximately 9 litres), and assuming that the six expansion cylinders (16b) of the split-cycle engine are the same (in terms of dimensions, positions, structure, etc.) as the six cylinders of said four-stroke engine; the latter was modified so as to simply integrate the compression section 10a beside the six existing cylinders. In particular, a reciprocating volumetric compressor was used with a 150 kW power and a displacement of three litres. With the layout according to the invention it is possible to obtain a power and a torque that are similar to the ones of a "traditional" Diesel internal combustion engine with a displacement that is 35% greater than the one of the engine that was modified, but with consumptions, a weight, dimensions and/or emissions that are advantageous.

The changes are relatively simple and there are only a few of them to be made. At the same time, in order to manufacture the split-cycle engine, the same, already used production lines can be used.

As far as the other features described above are concerned, the arrangement of the axes 42a and 42b helps optimize dimensions; the rear arrangement of the transmission 48 allows torsional vibrations to be limited; and the fact of manufacturing the engine block 43 as one single piece allows the portion 43a to be manufactured in one single operation together with the portion 43b, by means of the same casting technologies that are normally used to manufacture engine blocks.

Furthermore, the arrangement of the compression section 10a beside the expansion section 10b allows the heat exchanger 55 to be placed in an advantageous position, which keeps the layout of the entire system 1 compact.

Owing to the above, it is evident that engine 2 can be subjected to changes and variants, without for this reason going beyond the scope of protection set forth in the appended claims.

The transmission 48, which transfers the motion to the shaft 23a, could be different from the one shown herein, for example it could comprise a chain transmission or a toothed belt transmission if the compressor 12 is arranged in the area of the front end of the engine 2.

The system 1 could have a system to inject a liquid substance into the chambers 19a of the compressor 12; in this way, during the compression, this substance evaporates and absorbs heat thanks to the phase change, so that it prevents the air temperature from exceeding its boiling temperature.

The invention claimed is:

1. A split-cycle internal combustion engine (2) comprising:
an engine block (43) comprising a first portion and a second portion (43b,43a);
an expansion section (10b) comprising:
a) a plurality of expansion cylinders (16b) arranged in said first portion (43b) and
b) a rotating drive shaft (23b) supported by said first portion (43b) and driven by said expansion cylinders (16b);
a compression section (10a) comprising a volumetric compressor (12), which has a rotating driven shaft (23a) and is a reciprocating compressor comprising at least a compression cylinder (16a) arranged in said second portion (43a);
said rotating driven shaft (23a) being supported by said second portion (43a) and being distinct and spaced from said rotating drive shaft (23b);
said first portion (43b) and said second portion (43a) being arranged side by side along a direction (44) orthogonal to a rotation axis (41b) of said rotating drive shaft (23b);
wherein said expansion cylinders (16b) and said compression cylinder (16a) comprise respective pistons (18b,18a) movable along respective axes (42b,42a) which are inclined with respect to one another so as to form an angle (A), said respective axes (42b, 42a) intersecting at an intersection point that lies below the split-cycle internal combustion engine (2), wherein rotating axes of the rotating driven shaft (23a) and said rotating drive shaft (23b), respectively, are arranged between the intersection point and said pistons (18b, 18a), and wherein said respective axes (42b, 42a) diverge from one another in a direction from said rotating axes of said rotating driven shaft (23a) and said rotating drive shaft (23b) toward said compression cylinder (16a) and said plurality of expansion cylinders (16b).

2. The engine according to claim 1, wherein said angle (A) is between greater than 0° and 30°.

3. The engine according to claim 1, wherein the rotation axes (41b,41a) of the rotating drive shaft (23b) and of the rotating driven shaft (23a) are parallel to one another.

4. The engine according to claim 1, wherein said first and second portions (43b,43a) form a monolithic piece.

5. The engine according to claim 1, wherein the engine further comprises a mechanical transmission (48), which is adapted to transfer the motion from said rotating drive shaft (23b) to said rotating driven shaft (23a) and is arranged at an end of said engine.

6. The engine according to claim 3, wherein said rotating drive shaft and said rotating driven shaft are coupled to said engine block in a rotary manner by means of respective main bearings,
which engage respective seats; and wherein said engine further comprises a lower engine block, which defines lower parts of said seats and is fixed to said engine block.

7. The engine according to claim 1, wherein said expansion section receives compressed air from said compression section through one or more connection ducts and through an intake manifold.

* * * * *